(12) United States Patent
Kimotsuki et al.

(10) Patent No.: US 6,868,200 B2
(45) Date of Patent: Mar. 15, 2005

(54) WAVELENGTH DIVISION MULTIPLEXING OPTICAL TRANSMISSION APPARATUS

(75) Inventors: Koichi Kimotsuki, Fukuoka (JP); Kazunori Hayami, Fukuoka (JP); Tatsuo Nagayoshi, Fukuoka (JP); Takanori Maki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 10/076,528

(22) Filed: Feb. 19, 2002

(65) Prior Publication Data

US 2003/0026528 A1 Feb. 6, 2003

(30) Foreign Application Priority Data

Aug. 6, 2001 (JP) ........................................ 2001-238260

(51) Int. Cl.[7] .............................................. G02B 6/28
(52) U.S. Cl. ........................... 385/24; 385/37; 359/130
(58) Field of Search ..................... 385/24, 37; 398/183; 359/130–131

(56) References Cited

U.S. PATENT DOCUMENTS

| | | | | |
|---|---|---|---|---|
| 4,893,353 A | * | 1/1990 | Iwaoka et al. ............... | 398/183 |
| 5,617,234 A | * | 4/1997 | Koga et al. .................... | 398/14 |
| 6,282,340 B1 | * | 8/2001 | Nasu et al. .................... | 385/37 |
| 6,377,723 B1 | * | 4/2002 | Saito et al. .................... | 385/15 |
| 6,477,294 B1 | * | 11/2002 | Jansen Van Doorn et al. ... | 385/24 |
| 6,498,878 B1 | * | 12/2002 | Ueda ............................ | 385/37 |
| 6,516,119 B2 | * | 2/2003 | Menezo et al. ................ | 385/37 |
| 6,684,009 B2 | * | 1/2004 | Ueda ............................ | 385/37 |
| 6,690,861 B2 | * | 2/2004 | Yoneda ........................ | 385/37 |

FOREIGN PATENT DOCUMENTS

| | | |
|---|---|---|
| EP | 0 703 679 | 3/1996 |
| JP | 2000-235200 | 8/2000 |

* cited by examiner

Primary Examiner—Ellen E. Kim
(74) Attorney, Agent, or Firm—Staas & Halsey LLP

(57) ABSTRACT

The present invention is directed to the provision of a wavelength division multiplexing optical transmission apparatus and, more particularly, to a wavelength division multiplexing optical transmission apparatus having high wavelength stability unaffected by the temperature characteristics, aging, etc. of an arrayed-waveguide grating (AWG) and its peripheral components. The wavelength division multiplexing optical transmission apparatus comprises: an arrayed-waveguide grating 10 having operating input/output ports and an input dummy port; a light emitting means 21 for generating a pilot signal to be input to the input dummy port; a light detecting means 22 for monitoring the pilot signal contained in a wavelength division multiplexed signal output from the operating output port; and a temperature control circuit 11 for controlling the temperature of the arrayed-waveguide grating in such a manner as to cancel the amount of wavelength fluctuation occurring in the arrayed-waveguide grating and detected by monitoring the pilot signal.

12 Claims, 13 Drawing Sheets

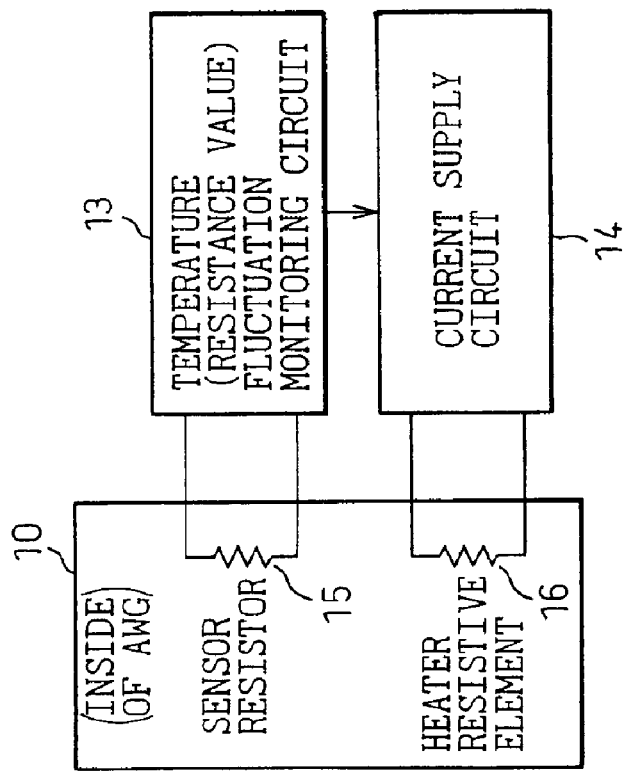
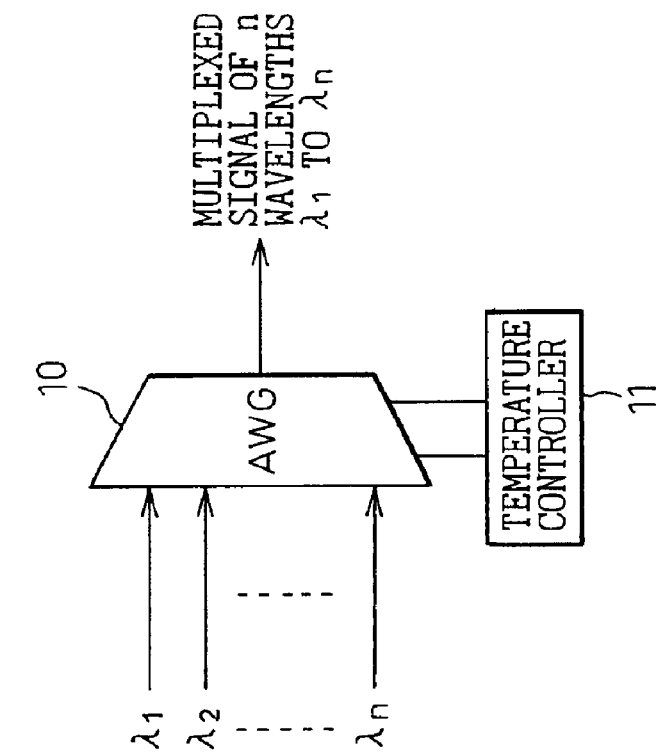

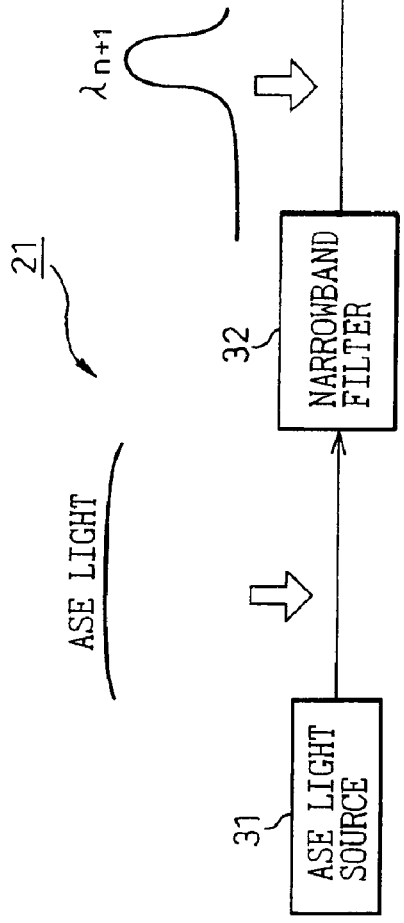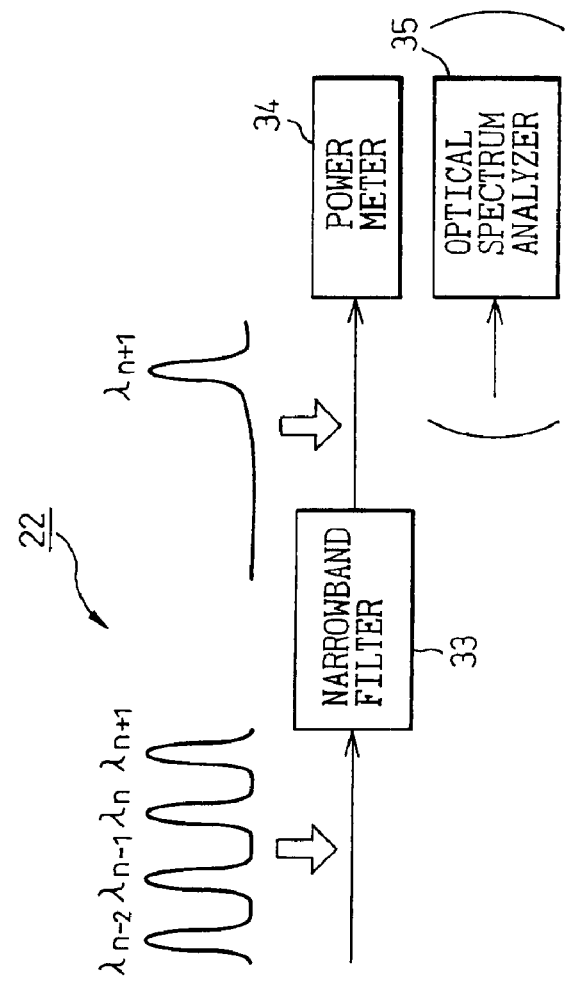
Fig.5A
Fig.5B

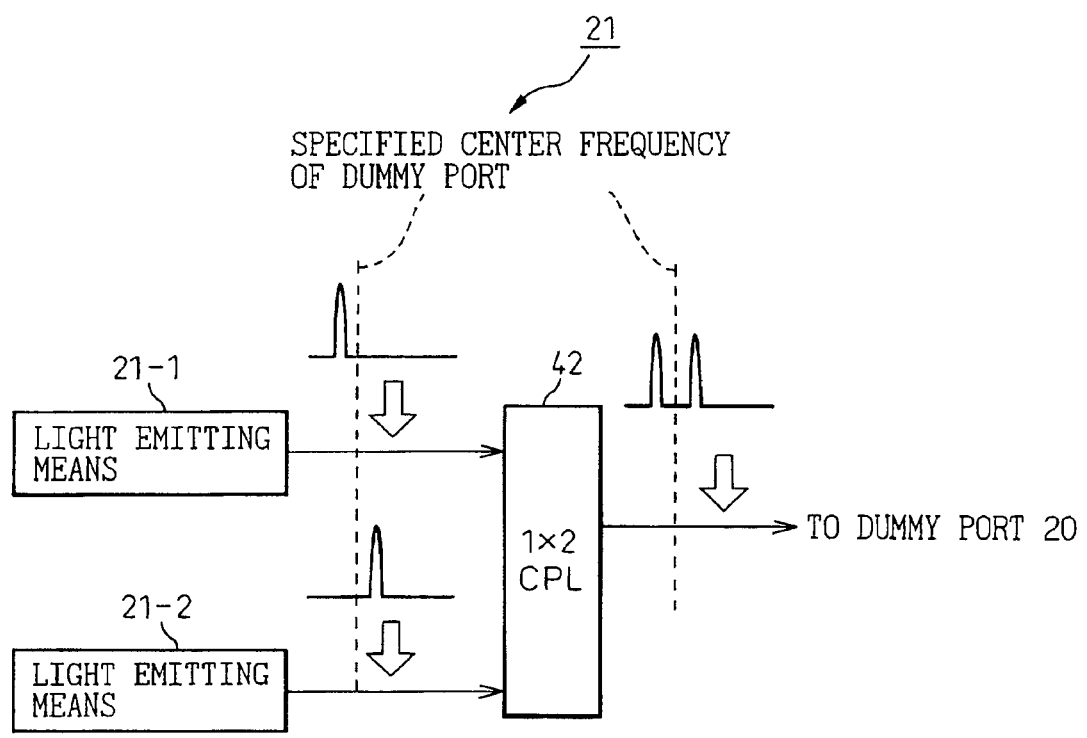

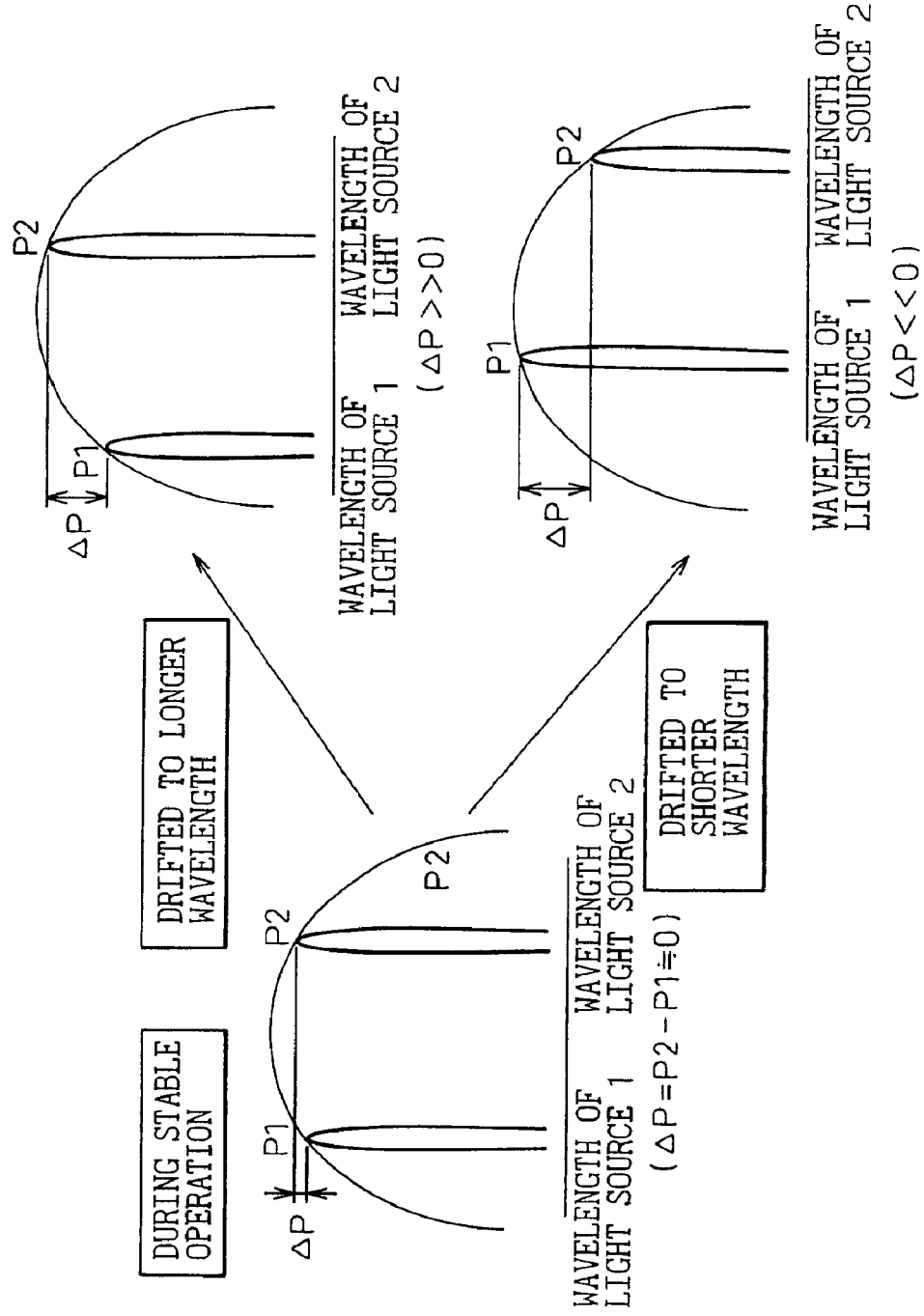

Fig.11

|  | WAVELENGTH FLUCTUATION | REFERENCE VOLTAGE SETTING | WRITE TO D/A |
|---|---|---|---|
| 1 | −10 pm | +350 mV | D A h |
| 2 | −8 pm | +280 mV | C 8 h |
| 3 | −6 pm | +210 mV | B 6 h |
| 4 | −4 pm | +140 mV | A 4 h |
| 5 | −2 pm | +70 mV | 92 h |
| 6 | ±0 pm | ±0 | 80 h |
| 7 | 2 pm | −70 mV | 6 E h |
| 8 | 4 pm | −140 mV | 5 C h |
| 9 | 6 pm | −210 mV | 4 A h |
| 10 | 8 pm | −280 mV | 38 h |
| 11 | 10 pm | −350 mV | 26 h |

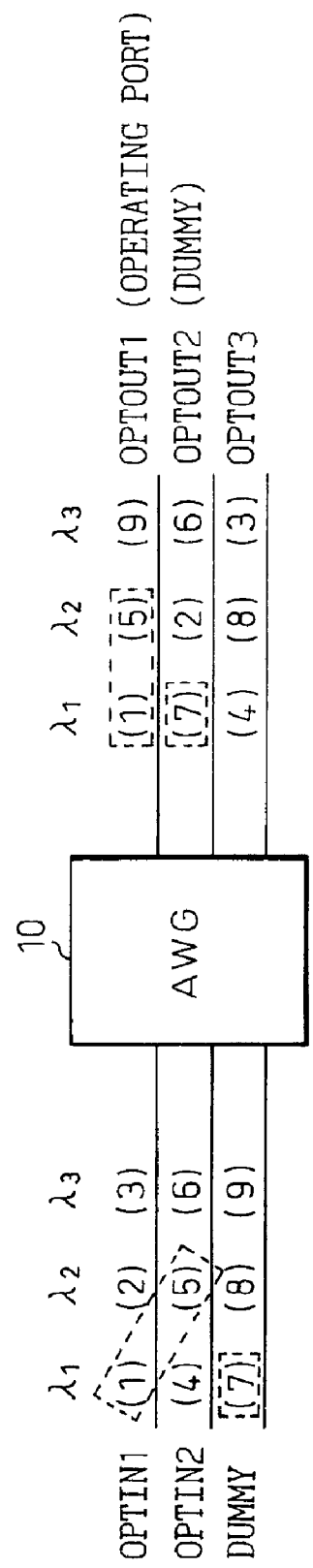

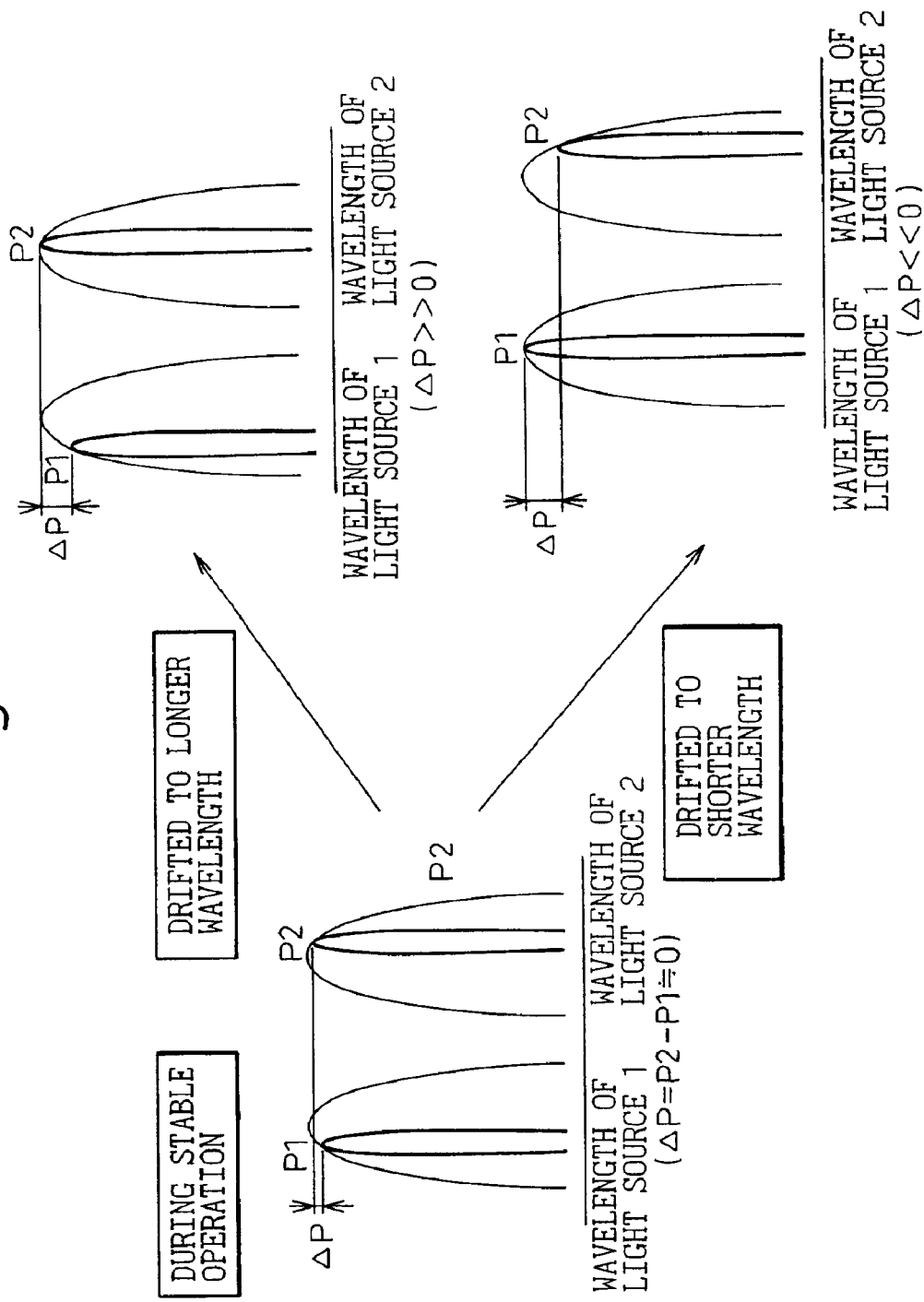

WAVELENGTH DIVISION MULTIPLEXING OPTICAL TRANSMISSION APPARATUS

BACKGROUND OF THE INVENTION

1. Field of the Invention

The present invention relates to an optical transmission apparatus. More particularly, the invention relates to a wavelength division multiplexing optical transmission apparatus that uses wavelength division multiplexing (WDM) for transmitting large amounts of data at high speed through a single optical fiber by multiplexing/demultiplexing optical signals of different wavelengths, and specifically to a wavelength division multiplexing apparatus in which the stability and accuracy of a filter bandwidth for each signal is increased for higher density wavelength multiplexing.

2. Description of the Related Art

FIGS. 1A to 3 are diagrams showing one configuration example of a multiplexer/demultiplexer in a prior art wavelength division multiplexing optical transmission apparatus.

The example shown in FIG. 1A uses an arrayed-waveguide grating (AWG) 10, the dominant type of optical multiplexer/demultiplexer in use today. The AWG 10 functions, like a diffracting grating, using interference of diffracted light beams from a plurality of waveguide arrays of different lengths, and is applied to various devices such as a wavelength combiner/splitter, a wavelength router, etc.

In wavelength division multiplexing, the AWG 10 takes different frequency components as inputs from a plurality of input ports and combines them for output through a single output port. Generally, the AWG 10 has an n×n frequency switching function, with n input ports and a matching number, n, of output ports, as shown in FIG. 2, and the frequency component from each input port is output through each corresponding output port. Since the above wavelength division multiplexing does not require all the output ports, only one of the output ports is used (signals λ1 to λ4 shown within the dashed lines on the input port side in the figure are output as a wavelength division multiplexed signal, λ1 to λ4, shown within the dashed lines on the output port side).

Here, as shown in FIG. 3, the AWG 10 is generally fabricated as a wavelength combiner/splitter comprising two slab waveguides 18 and 19, having collimating and converging lens functions, integrated on a single substrate 17. The optical filter characteristics between the input and output ports of the AWG 10 have temperature dependence, the parameter being the length of each waveguide, so that the filter bandwidth fluctuates as the waveguide expands or shrinks due to changes in temperature. The fluctuation is the same for each channel, and a wavelength shift manifests itself as the same vector change on all channels.

Therefore, the AWG 10 incorporates a temperature control circuit 11 in order to stabilize the filter characteristics at the specified wavelength. FIG. 1B shows a prior art configuration example of the temperature control circuit incorporated in the AWG. In the example shown here, a sensor resistor 15 having a stable resistance temperature coefficient and a heater resistive element 16 for generating heat proportionally to power consumption are mounted within the AWG, and further, circuits 13 and 14 for temperature control are provided that detect a change in the resistance of the sensor resistor 15 and supply current to the heater resistive element 16.

However, since its component parts themselves are subject to initial variations and other characteristic degrading factors such as temperature variations and aging, the prior art temperature control circuit, 13 to 16, has had the problem that if the initial variations existing in the component parts can be accommodated at the time of initial setting, there is no way to cope with the fluctuation of the filter center wavelength that may occur due to temperature variations of the parts, aging of the AWG, etc. during operation thereafter. As a result, the wavelength division multiplexing optical transmission apparatus has had to be designed by also considering wavelength stability degrading factors such as temperature characteristics and aging, and this has been one of the great barriers to the development of higher density wavelength division multiplexing optical transmission apparatus.

SUMMARY OF THE INVENTION

In view of the above-described problem, it is an object of the present invention to provide a wavelength division multiplexing optical transmission apparatus wherein, in addition to the prior art technique that detects and controls the temperature of the AWG which indirectly indicates the filter characteristics of the AWG, means for directly monitoring fluctuations in filter wavelength is incorporated in the AWG to directly detect the filter wavelength fluctuations caused by the temperature characteristics and aging of the component parts, and the temperature of the AWG is controlled in such a manner as to cancel the effect of the fluctuation.

In this way, not only at the time of initial setting, but during operation thereafter, the amount of wavelength fluctuation due to temperature variations and aging can be detected and controlled in a comprehensive manner, dramatically improving the stability accuracy of the AWG filter wavelength. As a result, a wavelength division multiplexing optical transmission apparatus having a higher density wavelength division multiplexing configuration can be achieved.

According to the present invention, there is provided a wavelength division multiplexing optical transmission apparatus comprising: an arrayed-waveguide grating having an output port and a plurality of input ports; light emitting means for generating a pilot signal to be input to one of the input ports; light detecting means for monitoring the pilot signal contained in a wavelength division multiplexed signal output from the output port; and a temperature control circuit for controlling the temperature of the arrayed-waveguide grating in such a manner as to cancel the amount of wavelength fluctuation occurring in the arrayed-waveguide grating and detected by monitoring the pilot signal.

The light emitting means is a wavelength tunable light source having a wavelength locking function, and generates signal light whose wavelength is swept within the bandwidth of the port at which the pilot signal is input. The light detecting means detects the amount of fluctuation in the filter characteristics of the port by detecting the swept signal light. The light emitting means comprises a plurality of light sources, and the light detecting means detects the amount of fluctuation in the filter characteristics of the port at which the pilot signal is input, by comparing received light levels between the plurality of light sources.

According to the present invention, there is also provided a wavelength division demultiplexing optical transmission apparatus comprising: an arrayed-waveguide grating having an input port and a plurality of output ports; light emitting means for generating a pilot signal to be input to the input port together with a wavelength division multiplexed signal; light detecting means for monitoring the pilot signal output from one of the output ports; and a temperature control circuit for controlling the temperature of the arrayed-waveguide grating in such a manner as to cancel the amount of wavelength fluctuation occurring in the arrayed-waveguide grating and detected by monitoring the pilot signal.

According to the present invention, there is further provided a wavelength division multiplexing optical transmission apparatus for transmitting a multiplexed signal carrying a first group of optical signals at different wavelengths, comprising: an arrayed-waveguide grating having a first output port from which is output the multiplexed signal carrying the first group of optical signals of different wavelengths respectively input from first to Nth input ports, and a second output port from which is output a multiplexed signal carrying a second group of optical signals of different wavelengths respectively input from the first to Nth input ports; light emitting means for applying a pilot signal having a wavelength belonging to the second group of optical signals to a corresponding one of the input ports; light detecting means for monitoring the pilot signal output from the second output port; and a temperature control circuit for controlling the temperature of the arrayed-waveguide grating in such a manner as to cancel the amount of wavelength fluctuation occurring in the arrayed-waveguide grating and detected by monitoring the pilot signal.

BRIEF DESCRIPTION OF THE DRAWINGS

The present invention will be more clearly understood from the description as set forth below with reference to the accompanying drawings.

FIG. 1A is a diagram showing one configuration example (1) of a multiplexer/demultiplexer in a prior art wavelength division optical transmission apparatus.

FIG. 1B is a diagram showing one configuration example (2) of the multiplexer/demultiplexer in the prior art wavelength division optical transmission apparatus.

FIG. 5A is a diagram showing one example (1) of light emitting means and light detecting means in FIG. 4.

FIG. 5B is a diagram showing one example (2) of the light emitting means and light detecting means in FIG. 4.

FIG. 7 is a diagram showing an example of the light emitting means of FIG. 4 when it is constructed from two light emitting means of different wavelengths.

FIG. 8 is a diagram showing the basic principle of wavelength fluctuation detection to be performed in FIG. 7.

FIG. 11 is a diagram showing one example of a temperature control table used in FIG. 10.

FIG. 14 is a diagram showing the basic concept illustrating how one of the output ports on an AWG is configured into a dummy port.

FIG. 15 is a diagram showing the basic principle of wavelength fluctuation detection to be performed in FIG. 13.

DESCRIPTION OF THE PREFERRED EMBODIMENTS

Noting that the temperature dependence of each filter wavelength of an AWG has the same vector for all ports, the present invention directly detects the fluctuation of the filter wavelength by utilizing the wavelength multiplexing function or n×n frequency switching function of the AWG and constantly monitoring the pilot signal applied to a predesignated dummy port. By feedback-controlling the temperature of the AWG in accordance with the result of the detection, the effect of the filter wavelength fluctuation is accurately canceled in such a manner as to offset the effects of the temperature characteristics and aging of its component parts, and the initially set conditions can thus be maintained.

Figure 4:
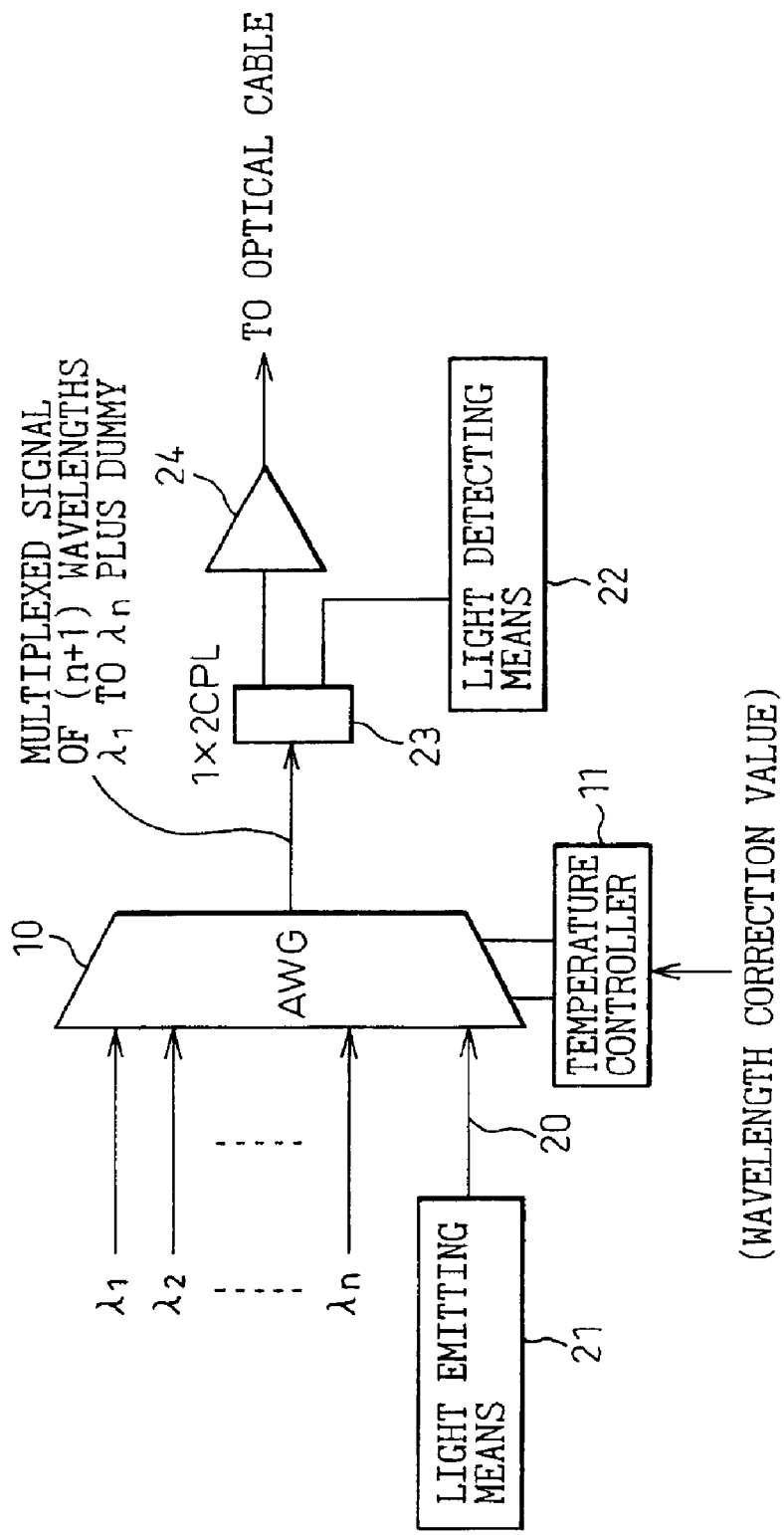
FIG. 4 is a diagram showing a first embodiment of the present invention.

FIG. 4 is a diagram showing a first embodiment of the present invention.

This embodiment shows an example in which the present invention is applied to the transmitting side of a wavelength division multiplexing optical transmission apparatus. In FIG. 4, one of the input ports on the AWG 10 which performs wavelength division multiplexing is preassigned for input of light of a wavelength different from any of the operating wavelengths $\lambda_1$ to $\lambda_n$ used for signal transmission to the receiving side (the preassigned input port is hereinafter designated the dummy port 20). A light emitting means 21 for generating the pilot signal is connected to the dummy port 20 of the AWG 10, so that a wavelength division multiplexed signal carrying a total of (n+1) waves, i.e., the operating wavelengths λ1 to λn plus the pilot signal, is output from the output port of the AWG 10.

The wavelength division multiplexed signal from the output port of the AWG 10 is split by a coupler (1×2 CPL) 23 into two outputs: one output signal (containing the pilot signal) is input to a light detecting means 22, and the other output signal is fed to an amplifier 24 where the signal power which dropped by 3 dB by the splitting into two outputs is amplified to its original level. Since the variation of the characteristics of each port of the AWG 10 has the same vector, as earlier noted, the wavelength fluctuation of the AWG 10 as a whole can be detected by the light detecting means 22 which is directly monitoring the amount of wavelength fluctuation between the input and output ports with the pilot signal applied to the dummy port 20.

Next, based on the amount of filter wavelength fluctuation detected by monitoring the pilot signal using the combination of the light emitting means 21 and light detecting means 22, feedback control is performed (with the wavelength correction value shown in the figure) on the temperature controller 11, the same one as used in the prior art, manually from outside the apparatus or automatically by using a controller or the like. As a result, the effect of the filter wavelength fluctuation is accurately canceled in such a manner as to offset the effects of the temperature characteristics and aging of the component parts, and the initially set conditions can thus be maintained.

FIGS. 5A to 8 show detailed configuration examples of the first embodiment according to the present invention.

FIGS. 5A and 5B show examples of the light emitting means 21 and light detecting means 22 in FIG. 4.

FIG. 5A shows an example in which amplified spontaneous emission (ASE) of an optical amplifier (or an LED) is used as the light emitting means 21 in FIG. 4.

ASE is a spontaneously emitted amplified light component which, in an optical amplifier, is an inherent noise source. When there is input light to the optical amplifier, the ASE level is small because the amplification bandwidth is concentrated at the signal light, but when there is no input light, the noise is amplified indiscriminately and a high level of ASE light is output over a wide bandwidth range. In the present invention, therefore, the optical amplifier is used as an ASE light source with no input light applied to it. In FIG. 5A, the pilot signal of wavelength band $\lambda_{n+1}$ different from any of the operating wavelengths $\lambda_1$ to $\lambda_n$ described with reference to FIG. 4 is generated by passing the ASE light from the ASE light source 31 through a narrowband filter 32, and the pilot signal thus generated is input to the dummy port 20 on the AWG 10.

FIG. 5B shows one configuration example of the light detecting means 22 in FIG. 4. In this example, the wavelength division multiplexed signal, $\lambda_1$ to $\lambda_{n+1}$, output from the AWG 10 is input to a narrowband filter 33 through which only the pilot signal $\lambda_{n+1}$, falling within the bandwidth of the dummy port, is allowed to pass. The pilot signal $\lambda_{n+1}$ is then input to a power meter 34 constructed from a photodiode (PD) or the like, where the fluctuation of the received signal level, that is, the amount of wavelength fluctuation caused by the fluctuation in the filter characteristics of the dummy port, is directly detected. Instead of the power meter 34, an optical spectrum analyzer 35 may be used to analyze the spectrum and detect the amount of wavelength fluctuation with higher accuracy. In this case, the filter 33 may be omitted.

Figure 6A:
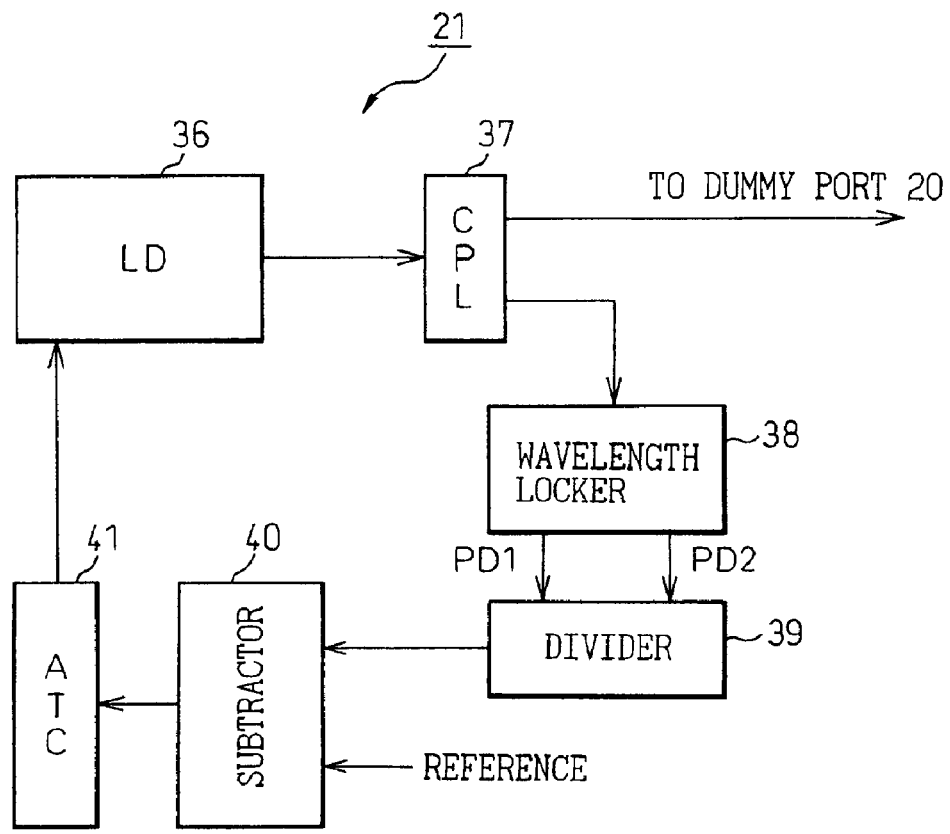
FIG. 6A is a diagram showing one example (1) of the light emitting means of FIG. 4 when it is constructed using a wavelength locker.
Figure 6B:
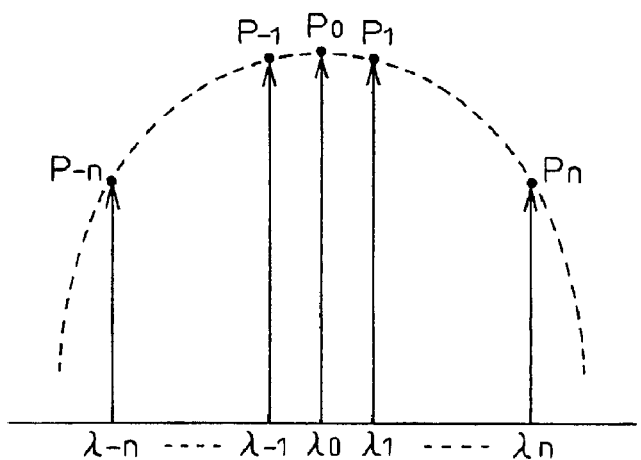
FIG. 6B is a diagram showing one example (2) of the light emitting means of FIG. 4 when it is constructed using the wavelength locker.

FIGS. 6A and 6B are diagrams showing another example of the light emitting means 21.

In FIG. 6A, the light emitting means 21 is constructed by combining a wavelength locker 38 with a laser diode (LD) 36 as a light source capable of outputting a signal of a highly stabilized wavelength. The wavelength locker 38 comprises two filters of different bands and photodiodes (PD1 and PD2), and the present wavelength is determined by performing a division between PD1 and PD2 (39); then, the wavelength is compared (40) with the reference (desired output wavelength of the LD 36), and the temperature of the LD 36 is controlled (41) based on the result of the comparison.

When the reference is varied, the emission wavelength of the LD 36 changes little by little as a result of the temperature control. Therefore, when the power meter 34 in FIG. 5B is used in combination with the light source 21 that uses the wavelength locker, and the emission wavelength is swept little by little, the filter waveform (P–n to Pn) between the input and output ports on the dummy port 20 can be directly monitored, as shown in FIG. 6B. According to this configuration, a function equivalent to the spectrum analysis performed using the optical spectrum analyzer 35 as the light detecting means 22 can be achieved using a PD power meter 34 of a simple construction.

FIG. 7 is a diagram showing still another example of the light emitting means 21.

In this example, two light emitting means 21-1 and 21-2 of different wavelengths are used, and the output lights from the respective means are combined by a coupler (1×2 CPL) 42 for input to the dummy port 20 on the AWG 10. The light emitting means 21-1 and 21-2 are each constructed from the above-described light source that uses the wavelength locker, and the wavelength of one of the two light sources is slightly shifted toward the shorter wavelength side of the desired filter center wavelength $\lambda_{n+1}$ of the dummy port 20, while the wavelength of the other light source is slightly shifted toward the longer wavelength side.

On the other hand, the optical spectrum analyzer 35 shown in FIG. 5B is used as the light detecting means 22, and the difference between the two signal light levels is monitored. Alternatively, two sets of narrowband filters and power meters, each filter for passing therethrough corresponding one of the wavelengths of the two signal lights, may be provided one for each signal light; in this case, the wavelength fluctuation can be detected by monitoring the difference between the levels indicated by the two power meters.

FIG. 8 shows the basic principle of the wavelength fluctuation detection performed using the two light emitting means 21-1 and 21-2.

In a stable condition, the signal light levels (P1 and P2) from the light emitting means 21-1 and 21-2 are equal to each other ($\Delta P = P1 - P2 \approx 0$), showing the signal detection level at the time of initial setting or during stable operation. Here, thin lines indicate the filter characteristics of the dummy port 20.

When the wavelengths drift in the longer wavelength direction, this means that the center wavelength of the filter characteristics is displaced in the longer wavelength direction due, for example, to a change in the temperature of the AWG 10; in this case, $\Delta P \gg 0$. Conversely, when the wavelengths drift in the shorter wavelength direction, this means that the center wavelength of the filter characteristics is displaced in the shorter wavelength direction; in this case, $\Delta P \ll 0$. In this way, when two signals of different wavelengths are used, the direction of wavelength drift, etc. can be detected by just comparing the received light levels of the two wavelengths, or the amount of wavelength fluctuation can be detected from the amount of variation in the level difference between the two received wavelength signals. Therefore, wavelength control is applied to the AWG so that the center wavelength moves in the direction opposite to the direction of drift.

Figure 9:
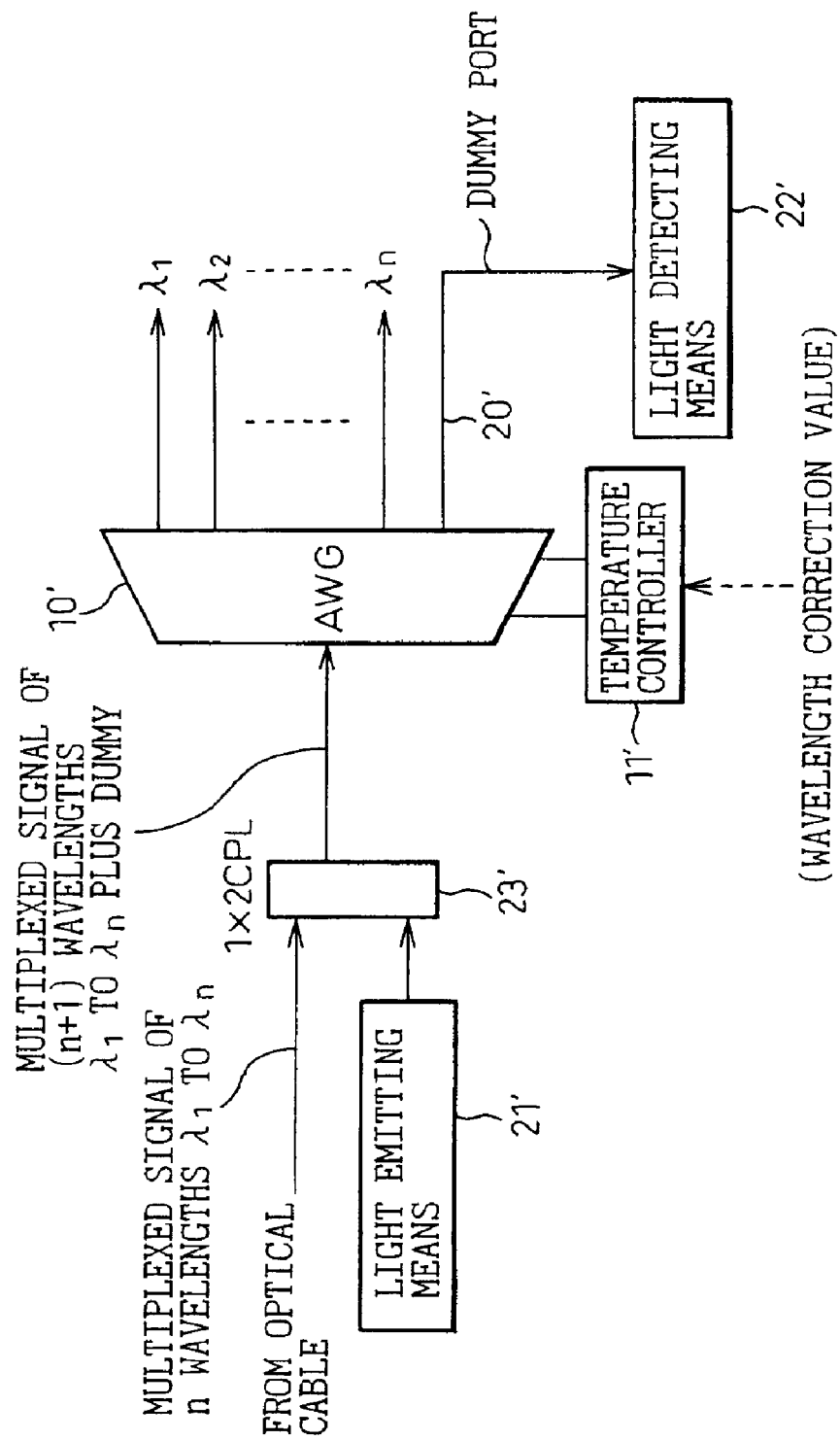
FIG. 9 is a diagram showing a second embodiment of the present invention.

FIG. 9 is a diagram showing a second embodiment of the present invention.

This embodiment shows an example in which the present invention is applied to the receiving side of a wavelength division multiplexing optical transmission apparatus. The AWG 10', temperature control circuit 11', coupler 23', light emitting means 21', light detecting means 23', and dummy port 20' at the receiving side are substantially the same as the corresponding components at the transmitting side previously described with reference to FIG. 4, and their detailed configuration examples are also the same as those shown in FIGS. 5 to 8. Therefore, these components will not be further described here.

Figure 2:
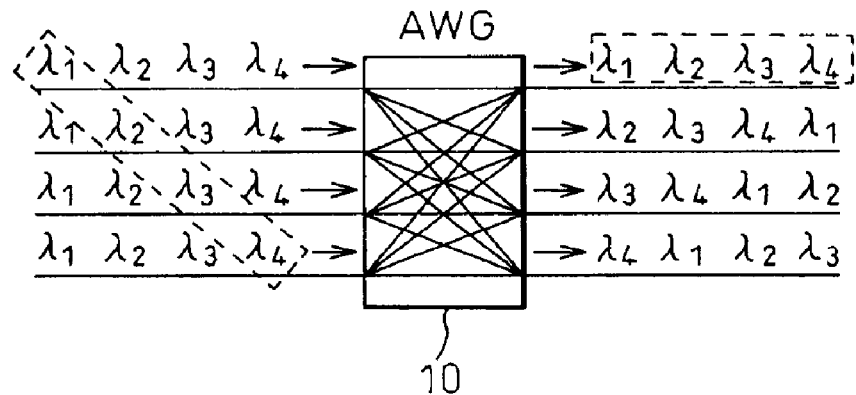
FIG. 2 is a diagram showing one example of an n×n frequency switching function of an AWG.
Figure 3:
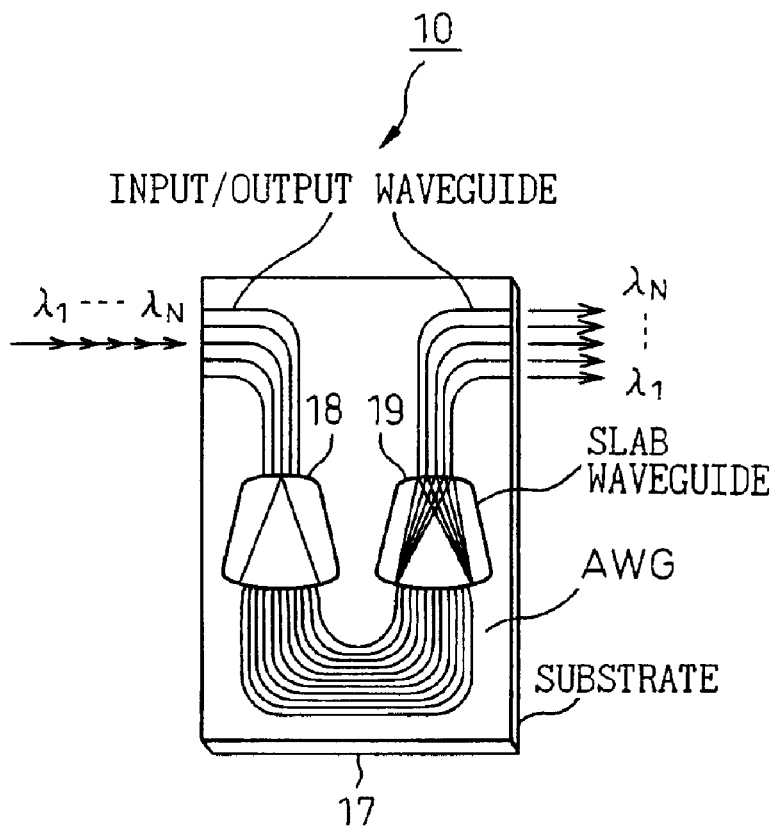
FIG. 3 is a diagram showing one example of a wavelength splitter constructed from an AWG.

In the previously given FIG. 3, the AWG 10 is shown as being used as a wavelength splitter at the receiving side, and the wavelength division multiplexed signal, $\lambda_1$ to $\lambda_N$, input to the input port is split into the respective wavelength signals $\lambda_N$ for output through the respective output ports. In the present invention, one of the output ports is used as the dummy port. More specifically, the pilot signal applied from the light emitting means 21' is extracted from the dummy port 20', the characteristics of the AWG are detected by the light detecting means in the same manner as earlier described, and correction is applied from the temperature control circuit 11' in a similar manner.

Figure 10:
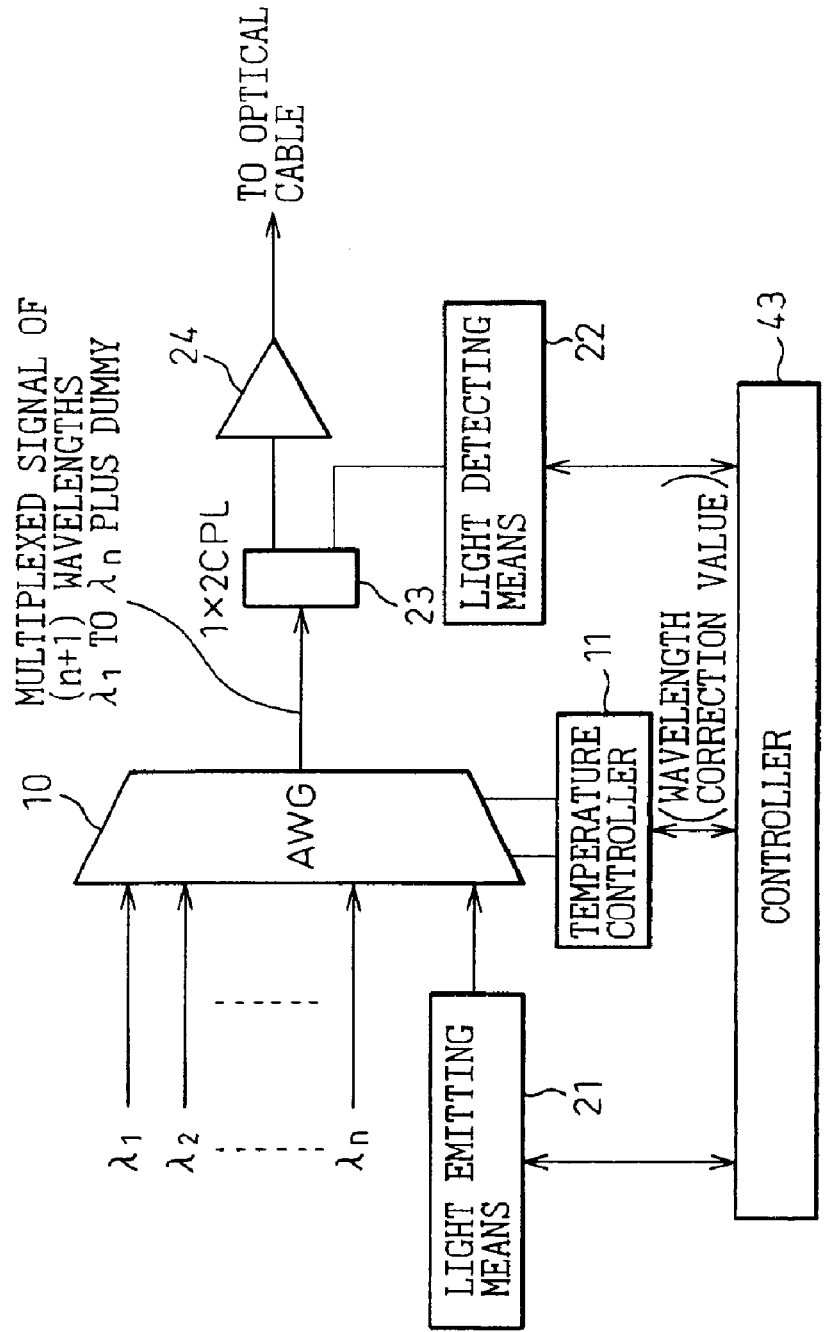
FIG. 10 is a diagram showing a third embodiment of the present invention.

FIGS. 10 and 11 are diagrams showing a third embodiment of the present invention.

As shown in FIG. 10, in this embodiment, a controller 43 constructed from a microprocessor circuit is used to control the temperature control circuit 11 for the AWG 10; here, for the control operation, the controller 43 uses the temperature control table 44 shown in FIG. 11. The temperature control table 44 stores reference voltage values for correcting for the amount of wavelength fluctuation detected by the light detecting means 22, and write values to a D/A converter (not shown) for generating the respective voltage values; the temperature control circuit 11 is controlled by the output of the D/A converter.

In this way, using the temperature control table 44 and the amount detected by the light detecting means 22, the controller 43 applies appropriate correction to the amount of fluctuation, such as in the filter characteristics of the AWG 10, in accordance with a program using a prescribed correction algorithm incorporated therein. According to the methods described with reference to FIG. 6(*b*) and FIG. 8, the need for the temperature control table 44 can be eliminated if the algorithm is written so as to bring the center wavelength of the filter to the specified wavelength in the former case, or so as to reduce the difference between the two received light levels to zero in the latter case.

Figure 12:
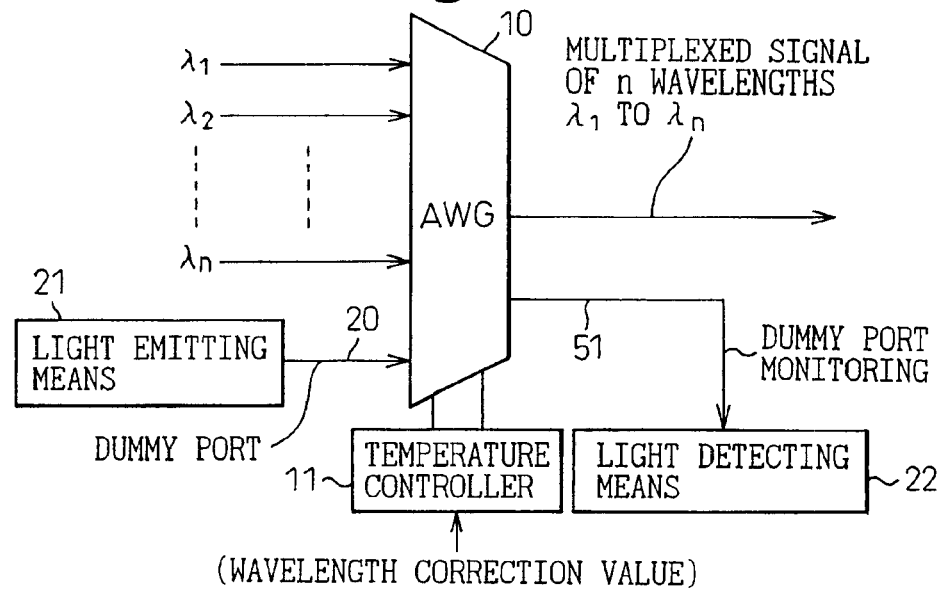
FIG. 12 is a diagram showing a fourth embodiment of the present invention.
Figure 13:
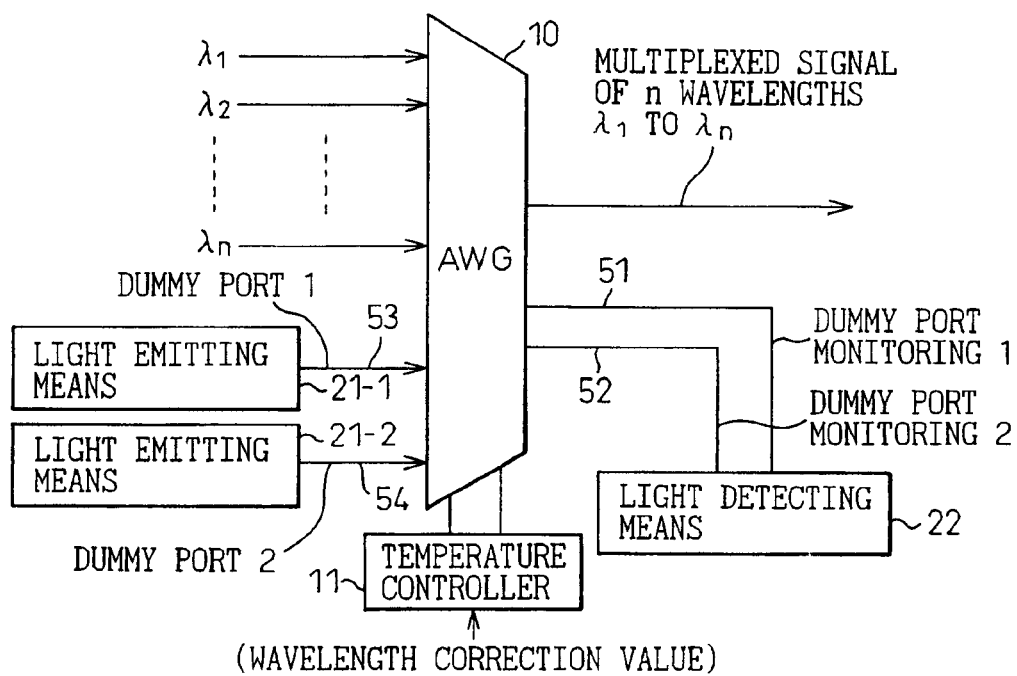
FIG. 13 is a diagram showing a fifth embodiment of the present invention.

FIG. 12 is a diagram showing a fourth embodiment as a modification of the configuration of FIG. 4. Likewise, FIG. 13 is a diagram showing a fifth embodiment as a modification of the configuration of FIG. 7.

In the embodiment of FIG. 4, the dummy port 20 has been provided only on the input side, but in the fourth embodiment, a dummy port 51 for monitoring is provided on the output side of the AWG 10 in addition to the one on the input side. In the fifth embodiment, a plurality of dummy ports 51 to 54 are provided on both the input and output sides of the AWG 10.

FIG. 14 is a diagram showing the basic concept illustrating how one of the output ports on the AWG 10 is configured into a dummy port.

FIG. 14 shows an example of the AWG 10 constructed as a simple 3×3 matrix. As shown by dashed lines in the figure, on the input side, two operating input ports (OPTIN1 and OPTIN2) are assigned for signal lights of wavelengths $\lambda_1(1)$ and $\lambda_2(5)$, respectively, and the remaining input port (dummy port) is assigned for the pilot signal of wavelength $\lambda_1(7)$. With these assignments, on the output side, a wavelength division multiplexed signal of wavelengths $\lambda_1(1)$ and $\lambda_2(5)$ is output from one operating output port (OPTOUT1) and the pilot signal of wavelength $\lambda_1(7)$ input to the input dummy port is output from another operating output port (OPTOUT2) which is assigned as an output dummy port. In this configuration, other wavelength signals (2) to (4), (6), (8), and (9) on the input side are not input.

With the assignments of signal lights as described above, the configurations shown in FIGS. 12 and 13 can be achieved with simple circuitry. These configurations eliminate the need for the coupler 23 and amplifier 24 at the transmitting side in FIG. 4 and the coupler 42 in FIG. 7, achieving reductions in hardware and manufacturing costs. Furthermore, the elimination of the coupler 23 offers the advantage of being able to provide a sufficient received light level since the loss due to splitting, etc. does not occur. There is also offered the advantage that the narrowband filter (33 in FIG. 5B) for passing only the pilot signal therethrough can be eliminated from the light detecting means 22.

FIG. 15 shows the basic principle of the wavelength fluctuation detection using the two light emitting means 21-1 and 21-2 in FIG. 13.

In the previously described example of FIG. 8, signals of slightly different wavelengths are input within the bandwidth of the dummy port, but in the example shown here, pilot signals of wavelengths located in different bandwidths are input to the respective dummy ports 53 and 54. Here, to one of the dummy ports is input the pilot signal whose wavelength is shifted by $\Delta\lambda$ from its center wavelength in the shorter wavelength direction, while to the other dummy port is input the pilot signal whose wavelength is shifted by $\Delta\lambda$ from its center wavelength in the longer wavelength direction.

As a result, the direction of the fluctuation of the received light level due to filter wavelength fluctuation is opposite between the two pilot signals. Therefore, the amount of wavelength fluctuation can be detected by comparing the received light levels of the two different wavelength signals, as in the case of the previously described example of FIG. 8. For the detailed operation, refer to the description given with reference to FIG. 8. In the configuration of FIG. 13, since there is no need to separate the two pilot signals of different wavelengths on the output side, power meters of simple construction need only be connected to the respective output ports 51 and 52, eliminating the need for an expensive optical spectrum analyzer to detect the two wavelengths.

As described above, according to the present invention, means for directly monitoring filter wavelength fluctuation is incorporated in the AWG, to directly detect the filter wavelength fluctuation resulting from the temperature characteristics and aging of its component parts, and control is performed in such a manner as to cancel the effect of the fluctuation. This offsets the effects of the temperature variations, aging, etc. of the component parts and, by detecting the amount of wavelength fluctuation caused by such variations, etc. and performing control so as to cancel the effect of the fluctuation, the stability and accuracy of the filter wavelength of the AWG can be dramatically enhanced and maintained for an extended period of time. As a result, a wavelength division multiplexing optical transmission apparatus having a higher density wavelength division multiplexing configuration can be achieved.

What is claimed is:

1. A wavelength multiplexing optical apparatus, comprising:

an arrayed-waveguide grating having an output port and a plurality of input ports;

light emitting means for generating a pilot signal to be input to one of the input ports;

light detecting means for monitoring the pilot signal extracted from a wavelength multiplexed signal output from the output port; and a temperature control circuit for controlling the temperature of the arrayed-waveguide grating in such a manner as to cancel the amount of wavelength fluctuation occurring in the arrayed-waveguide grating and detected by monitoring the pilot signal.

2. A wavelength multiplexing optical apparatus as claimed in claim 1, wherein the light emitting means is a wavelength tunable light source having a wavelength locker function, and generates signal light whose wavelength is swept within the bandwidth of the port at which the pilot signal is input, and the light detecting means detects the amount of fluctuation in the filter characteristics of the port by detecting the swept signal light.

3. A wavelength multiplexing optical apparatus as claimed in claim 1, wherein the light emitting means comprises a plurality of light sources, and the light detecting means detects the amount of fluctuation in the filter characteristics of the port at which the pilot signal is input, by comparing received light levels between the plurality of light sources.

4. A wavelength multiplexing optical apparatus for outputting a multiplexed signal carrying a first group of optical signals at different wavelengths, comprising:

an arrayed-waveguide grating having a first output port outputting the multiplexed signal carrying the first group of optical signals of different wavelengths respectively input from input ports, and a second output port outputting a pilot signal input from an input port, wherein said first group of optical signals and said pilot signal are transmitted only once by a common arrayed-waveguide;

light emitting means for applying said pilot signal;

light detecting means for monitoring the pilot signal output from the second output port; and a temperature control circuit for controlling the temperature of the arrayed-waveguide grating in such a manner as to cancel the amount of wavelength fluctuation occurring in the arrayed-waveguide grating and detected by monitoring the pilot signal.

5. A wavelength multiplexing optical apparatus as claimed in claim 4, wherein the light emitting means is a wavelength tunable light source having a wavelength locker function, and generates signal light whose wavelength is swept within the bandwidth of the port at which the pilot signal is input, and the light detecting means detects the amount of fluctuation in the filter characteristics of the port by detecting the swept signal light.

6. A wavelength multiplexing optical apparatus as claimed in claim 4, wherein the light emitting means comprises a plurality of light sources, and the light detecting means detects the amount of fluctuation in the filter characteristics of the port at which the pilot signal is input, by comparing received light levels between the plurality of light sources.

7. A wavelength multiplexing optical apparatus, comprising:

an arrayed-waveguide grating having an output port and a plurality of input ports;

a light emitter, to generate a pilot signal input to one of the input ports;

a light detector, to monitor the pilot signal extracted from a wavelength multiplexed signal output from the output port; and a temperature control circuit, to control the temperature of the arrayed-waveguide grating and to cancel wavelength fluctuation occurring in the arrayed-waveguide grating by monitoring the pilot signal.

8. The wavelength multiplexing optical apparatus according to claim 7, wherein the light emitter includes a wavelength locker and is a wavelength tunable light source to generate signal light whose wavelength is swept within the bandwidth of the port at which the pilot signal is input, and the light detector detects the fluctuation in the filter characteristics of the port by detecting the swept signal light.

9. The wavelength multiplexing optical apparatus according to claim 7, wherein the light emitter comprises a plurality of light sources, and the light detector detects the amount of fluctuation in the filter characteristics of the port at which the pilot signal is input by comparing received light levels between the plurality of light sources.

10. A wavelength division multiplexing optical transmission apparatus transmitting a multiplexed signal carrying a first group of optical signals at different wavelengths, comprising:

an arrayed-waveguide grating comprising:

a first output port outputting the multiplexed signal carrying the first group of optical signals of different wavelengths respectively input from input ports, and a second output port outputting a pilot signal input from an input port, wherein said first group of optical signals and said pilot signal are transmitted only once by a common arrayed-waveguide;

a light emitter applying the pilot signal;

a light detector monitoring the pilot signal output from the second output port; and a temperature control circuit controlling the temperature of the arrayed-waveguide grating and canceling wavelength fluctuation occurring in the arrayed-waveguide grating by monitoring the pilot signal.

11. A wavelength multiplexing optical apparatus according to claim 10, wherein the light emitter includes a wavelength locker and is a wavelength tunable light source generating signal light whose wavelength is swept within the bandwidth of the port at which the pilot signal is input, and the light detector detects the fluctuation in the filter characteristics of the port by detecting the swept signal light.

12. A wavelength multiplexing optical apparatus as claimed in claim 10, wherein the light emitter comprises a plurality of light sources, and the light detector detects the amount of fluctuation in the filter characteristics of the port at which the pilot signal is input by comparing received light levels between the plurality of light sources.

* * * * *